United States Patent [19]
Inana et al.

[11] Patent Number: 5,940,650
[45] Date of Patent: *Aug. 17, 1999

[54] FILM TRANSPORTING DEVICE HAVING GUIDE MEMBERS AT PREDETERMINED LOCATIONS

[75] Inventors: Katsuya Inana; Kenichi Hoshi, both of Asaka, Japan

[73] Assignee: Fuji Photo Film Co., Ltd., Kanagawa, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/808,964

[22] Filed: Feb. 19, 1997

[30] Foreign Application Priority Data

Feb. 23, 1996 [JP] Japan ................................. 8-036178
Feb. 23, 1996 [JP] Japan ................................. 8-036179
Dec. 27, 1996 [JP] Japan ................................. 8-349938

[51] Int. Cl.$^6$ ............................. G03B 1/18; H04N 2/253
[52] U.S. Cl. ........................... 396/440; 396/415; 348/96; 242/349; 226/189
[58] Field of Search .................................. 396/310, 319, 396/387, 439, 440, 320, 395, 411, 415, 562; 242/615, 615.3, 332, 348.3, 349; 352/224; 348/97, 209, 96, 98; 226/188, 189

[56] References Cited

U.S. PATENT DOCUMENTS 3,250,586 5/1966 Winkler ................................. 352/224
4,132,473 1/1979 Kondo ................................... 396/440
5,600,385 2/1997 Takeshita ........................... 396/440 X

FOREIGN PATENT DOCUMENTS 4-60531 2/1992 Japan .
4-86639 3/1992 Japan .
7-298135 11/1995 Japan .
8-171112 7/1996 Japan .

Primary Examiner—Safet Metjahic
Assistant Examiner—J. K. Han
Attorney, Agent, or Firm—Sughrue, Mion, Zinn, Macpeak & Seas, PLLC

[57] ABSTRACT

A windup reel is formed at a step reel which has a small diameter section and a large diameter section. The large diameter section is formed in such a direction as to press a lower edge of photographic film against a guide pin. When a leader section of transported photographic film is wound on the windup reel, the leader section tries to fit the surface of the large diameter section. For this reason, the force is applied to the photographic film so that the photographic film can move toward the large diameter section. The photographic film moves toward the guide pin, and the edge of the photographic film is pressed against the guide pin. Thereby, the photographic film is transported along the guide pin.

11 Claims, 9 Drawing Sheets

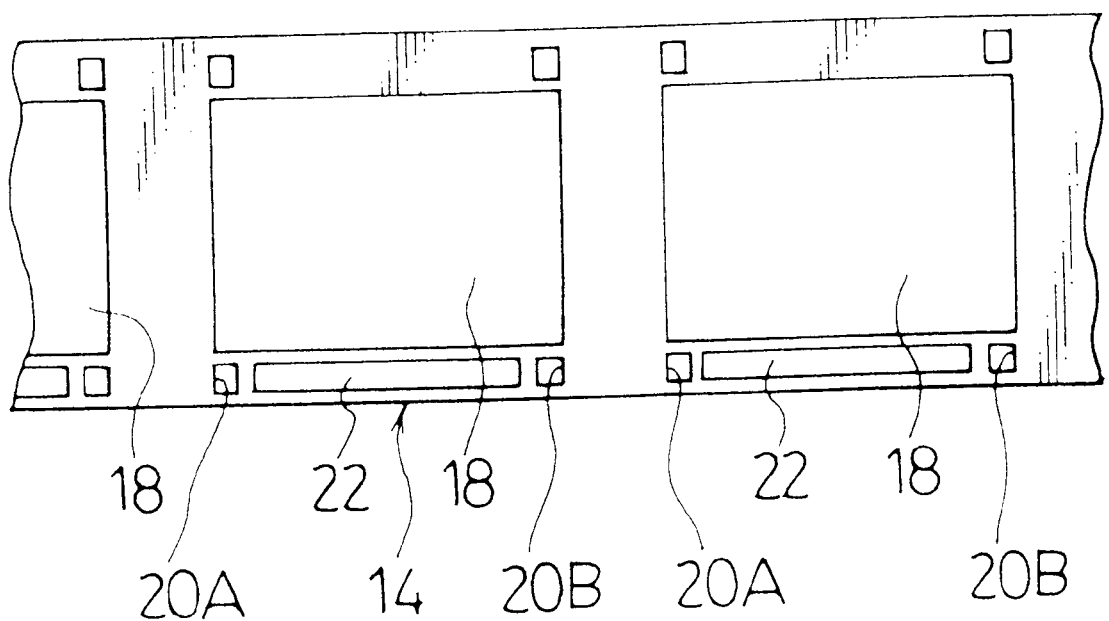
F I G. 2

F I G. 6
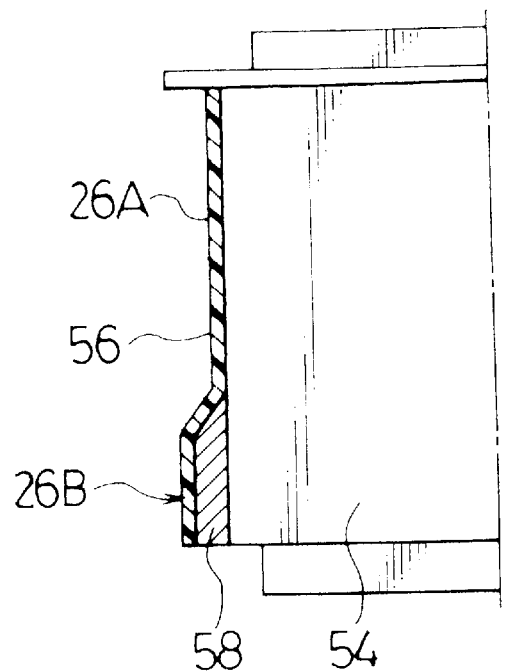
F I G. 7
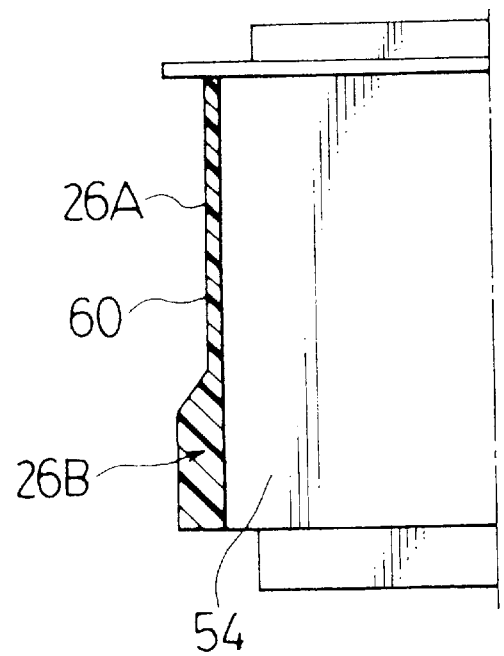

FIG. 13
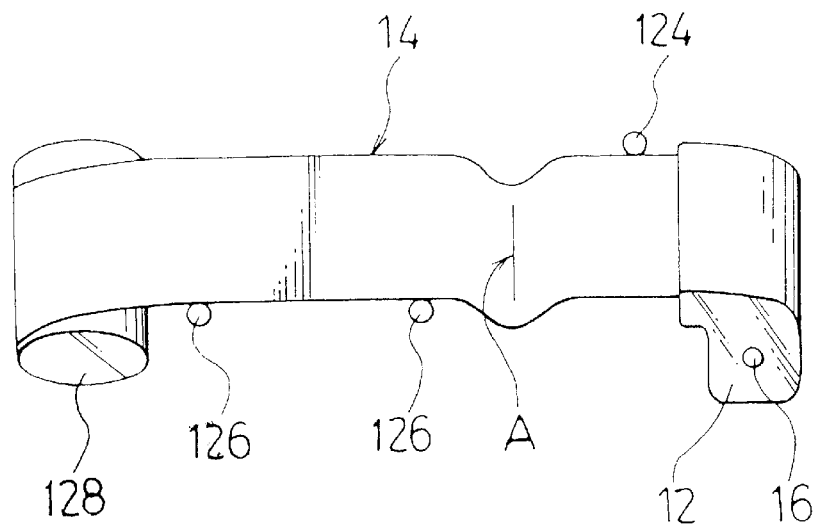
FIG. 14  PRIOR ART
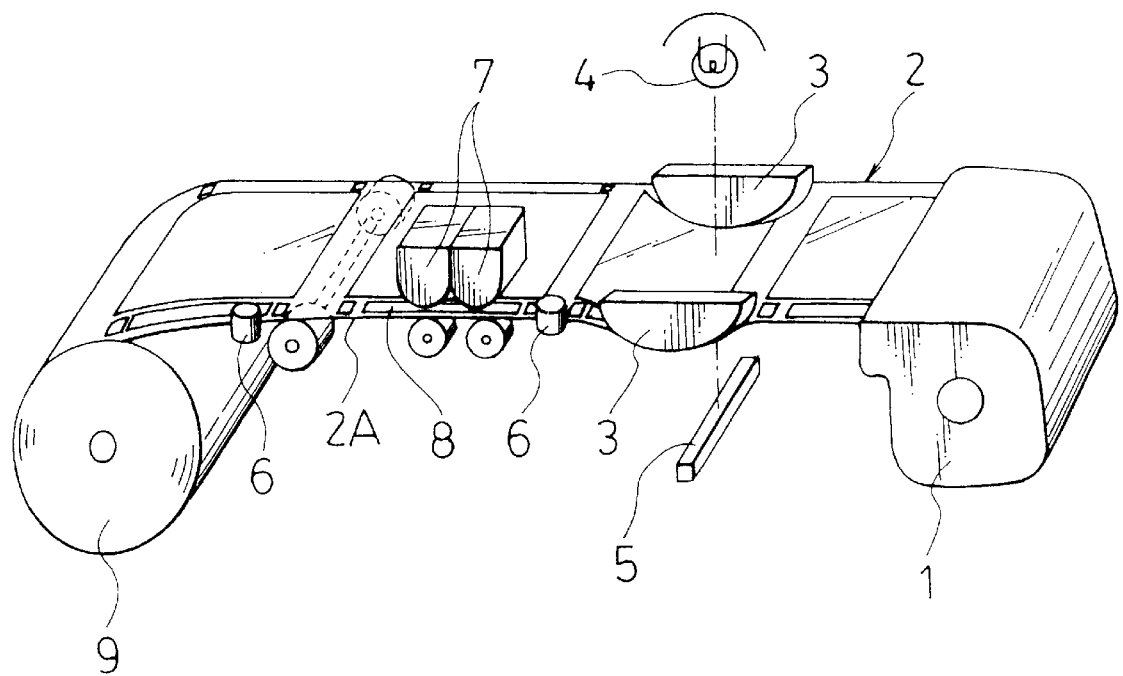

FILM TRANSPORTING DEVICE HAVING GUIDE MEMBERS AT PREDETERMINED LOCATIONS

BACKGROUND OF THE INVENTION

1. Field of the Invention

The present invention relates generally to a film transporting device, and more particularly to a film transporting device applied to a camera, a film scanner, a film viewer, and the like.

2. Description of the Related Art

A camera is proposed which uses photographic film coated with a magnetic recording layer, and writes the date and time of photographing, the photographing information, etc. by a magnetic head, or reads out the information from the photographic film while the photographic film is fed during photographing (Japanese Patent Provisional Publication Nos. 4-60531 and 4-86639). After the photographic film is developed, the information recorded in the magnetic recording layer is used when film images are picked up by an image sensor and are displayed on a TV monitor, or when the film images are printed on printing paper.

In order to correctly write the information in the magnetic recording layer or read out the information, the photographic film must be accurately transported toward the magnetic head. The photographic film is fed in such a manner that both edges in the longitudinal direction are guided by guide pins. However, because the guide pins are arranged at intervals wider than the width of the photographic film, the guide pins alone cannot prevent the photographic film from being displaced during feeding. Thus, the magnetic recording layer does not accurately contact the magnetic head, and the information cannot be correctly written.

To eliminate the above-mentioned disadvantages, the camera in Japanese Patent Provisional Publication No. 4-60531 prevents the displacement between the magnetic recording layer and the magnetic head by fixing the magnetic head to a continuous guide member and pressing the guide member against one edge of the photographic film by a spring during feeding.

In the camera of Japanese Patent Provisional Publication No. 4-866939, the magnetic head is fixed to a film pressure plate, which is moved by the force of a spring. The guide member formed at the film pressure plate is thereby pressed against one edge of the photographic film which is being fed, so that the displacement between the magnetic recording layer and the magnetic head can be prevented.

A film image input device has been recently proposed which picks up images on a developed continuous photographic film by an image sensor such as a charge coupled device (CCD), and displays the images on a TV monitor.

FIG. 14 shows one example of a conventional film image input device. As shown in FIG. 14, the developed photographic film 2 is pulled out from a film cartridge 1, and the photographic film 2 which curves in the direction of its width is straightened by curved guide plates 3. Then, the light source 4 illuminates film images on the straightened photographic film, and a line sensor 5 picks up the transmitted images through a taking lens. The photographic film 2 passes through a scanning area of the line sensor 5, and it is fed in such a manner that one edge 2A is pressed against a pair of guide pins 6 by a pressing means (not shown) provided at the rear of the pair of guide pins 6. Information is written in or read from a magnetic recording layer 8 on the photographic film 2 by magnetic heads 7, and then the photographic film 2 is wound up by a windup reel 9. The inventors of this application have disclosed the above-mentioned guide plate 3 in Japanese Patent Provisional Publication No. 7-298135, and proposed the above-mentioned pressing means in Japanese Patent Application No. 6-313266.

A displacement prevention mechanism disclosed in Japanese Patent Provisional Publication Nos. 4-60531 and 4-86639 moves the magnetic head via the guide member and a film pressure plate. Thus, this displacement prevention mechanism has a disadvantage in that the structure thereof is complicated and many parts are required. The film image input device in FIG. 14 has a disadvantage because the film, which must be kept flat by a guide plate 3 in a direction in which a line sensor reads film images, curves due to the difference of the mounting position of the film cartridge 1, and the warped images are displayed on the TV monitor.

Such disadvantages can be solved if the pressing means is not provided, and therefore the photographic film 2 against the guide pins 6. In this case, however, the photographic film 2 is not pressed and the magnetic heads 7 are displaced, and the film images cannot be read steadily, or the magnetic information cannot be read or written steadily.

SUMMARY OF THE INVENTION

The present invention has been developed in view of the above-described circumstances, and has as its object the provision of a simply-constructed film transporting device which is able to steadily transport photographic film and prevent the photographic film from moving on a slant or zigzagging.

In order to achieve the above-mentioned object, the present invention is directed to a film transporting device which has a film supplying means for supplying continuous photographic film, a film windup means provided with a windup reel for winding up the photographic film supplied from the film supplying means, and a guide means for guiding the photographic film transported between the film supplying means and the film windup means and provided with a guide member for regulating movement of said photographic film in a direction of width during transporting of the photographic film. The invention is characterized in that when the film windup means winds up the photographic film, an outer diameter of the windup reel in an axial direction is changed so that one edge of the photographic film is pressed against the guide member.

If the outer diameter of the windup reel in its axial direction is changed, the photographic film wound around the windup reel moves toward a position of a larger diameter. Thereby, one edge of the photographic film is pressed against the guide member, and the photographic film is steadily transported along the guide member without moving on a slant or zigzagging.

According to another mode of the present invention, a film transporting device has a film supplying means for supplying continuous photographic film, a film windup means provided with a windup reel for winding up the photographic film supplied from the film supplying means, and a guide means for guiding the photographic film transported between the film supplying means and the film windup means and provided with a guide member for regulating the movement of the photographic film in a direction of width during transporting of the photographic film. The invention is characterized in that when the film windup means winds up the photographic film, a rotational axis of the windup reel is inclined so that one edge of said photographic film can be pressed against the guide member.

The positions of both edges of the photographic film are regulated by the first and second guide members, and thereby the photographic film can be prevented from moving on a slant or zigzagging.

BRIEF DESCRIPTION OF THE DRAWINGS

The nature of this invention, as well as other objects and advantages thereof, will be explained with reference to the accompanying drawings, in which like reference characters designate the same or similar parts throughout the figures and wherein:

FIG. 2 is a plan view illustrating an embodiment of photographic film;

FIG. 6 is a partially sectional view illustrating a first variation of the first embodiment of the windup reel in FIG. 4;

FIG. 7 is a partially sectional view illustrating a second variation of the first embodiment of the windup reel in FIG. 4;

FIG. 13 is a conceptional view of the fourth embodiment illustrating the photographic film being transported by means of guide pins; and FIG. 14 is a view illustrating one example of the film scanner of a conventional film transporting device.

DETAILED DESCRIPTION OF THE PREFERRED EMBODIMENTS

Figure 1:
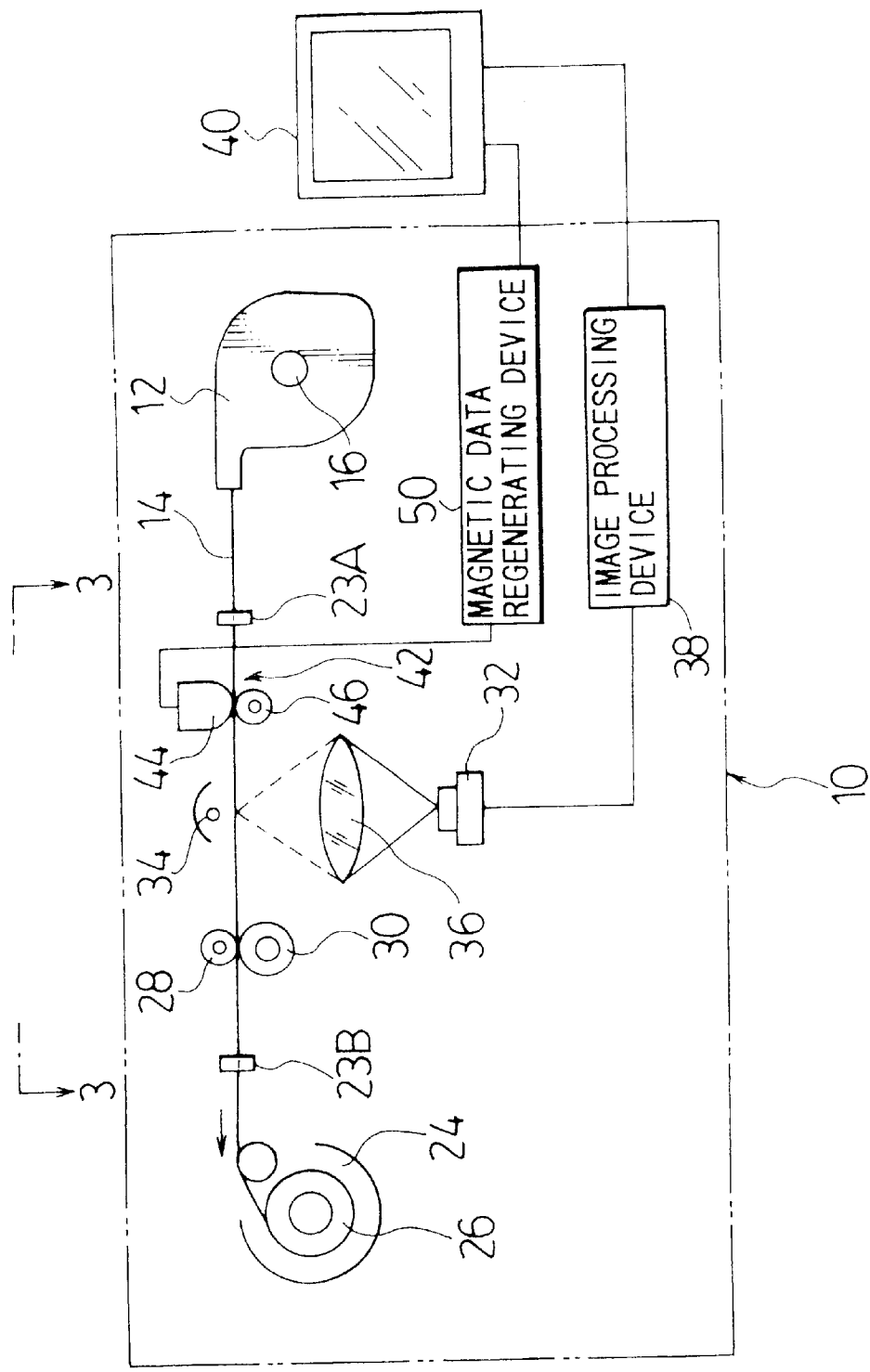
FIG. 1 is a view illustrating the structure of a film scanner to which a film transporting device of the present invention applies.

FIG. 1 illustrates the structure of a film scanner which a film transporting device of the present invention applies to.

The film scanner reads film images while a developed photographic film coated with a magnetic recording layer is being transported, and the film scanner reads the information recorded in the magnetic recording layer on the photographic film or writes the information in the magnetic recording layer.

A film cartridge 12 is mounted in a film scanner body 10 which is indicated by the long and short alternate lines in FIG. 1. The photographic film 14 is wound around a spool 16 in a film cartridge 12. As depicted in FIG. 2, image areas 18, 18 . . . are formed on the photographic film 14 at predetermined intervals in the longitudinal direction. Perforations 20A and 20B are formed at a front end and a read end, respectively, of each image area 18. A magnetic recording layer 22 is formed between the perforations 20A and 20B for each image area 18.

The photographic film 14 is pulled out from the film cartridge in FIG. 1 by a film driving mechanism, and the film 14 is guided by guide pins 23A and 23B and transported in a direction indicated by an arrow of FIG. 1. The guide pins 23A and 23B are provided at a film guide member (not shown).

The film driving mechanism consists of a film supplying section, which is coupled to the spool 16 of the film cartridge 12; a film windup section, which is coupled to a windup reel 26 of a film windup chamber 24; and a film driving section which feeds the photographic film 14 from the film supplying section at a constant speed with the film 14 being pinched between a capstan 28 and a pinch roller 30. The windup reel 26 will be described later.

The film supplying section drives the spool 16 of the film cartridge 12 in the counter clockwise direction in the drawing, and feeds the photographic film 14 from the film cartridge 12 until the windup reel 26 winds up the leader of the film. The film supplying section is provided with a clutch mechanism (not shown) for controlling the rotation of the spool 16. The photographic film 14 is fed in a constant tension by the driving force of the clutch mechanism and the capstan 28.

A CCD line sensor 32, which scans frame images on the photographic film, is built in the film scanner body 10. The CCD line sensor 32 is arranged in a direction perpendicular to the feed direction of the photographic film 14. The CCD line sensor 32 reads, through a taking lens 36, the transmitted image of the photographic film 14 which is being fed and illuminated by a light source 34. Electric signals are converted by a photoelectrical transfer element, and are image-processed by an image processing device 38. Then the electric signals are output as video signals to a TV monitor 40. The images on the photographic film are displayed on the TV monitor 40.

The photographic film 14 is sent out from the film cartridge 12 and passes through a magnetic head device 42 before the scan area. The magnetic head device 42 is constructed in such a manner that a magnetic head 44 is arranged on the top side of the photographic film 14, and the magnetic head 44 is fixed to the film scanner body 10. A pad 46 is arranged on the bottom side of the photographic film 14 at a position opposite to the magnetic head 44. The pad 46 is pushed up by a spring (not shown), and presses the magnetic recording layer 22 of the photographic film 14 against the magnetic head 44. The magnetic head device 42 is thereby able to write the information in the magnetic recording layer 22 from the magnetic head 44, and read out the information written in the magnetic recording layer 22. A magnetic data regenerating device 50 in FIG. 1 regenerates the readout magnetic information, so that the magnetic information as well as the film images can be displayed on the TV monitor 40.

Figure 3:
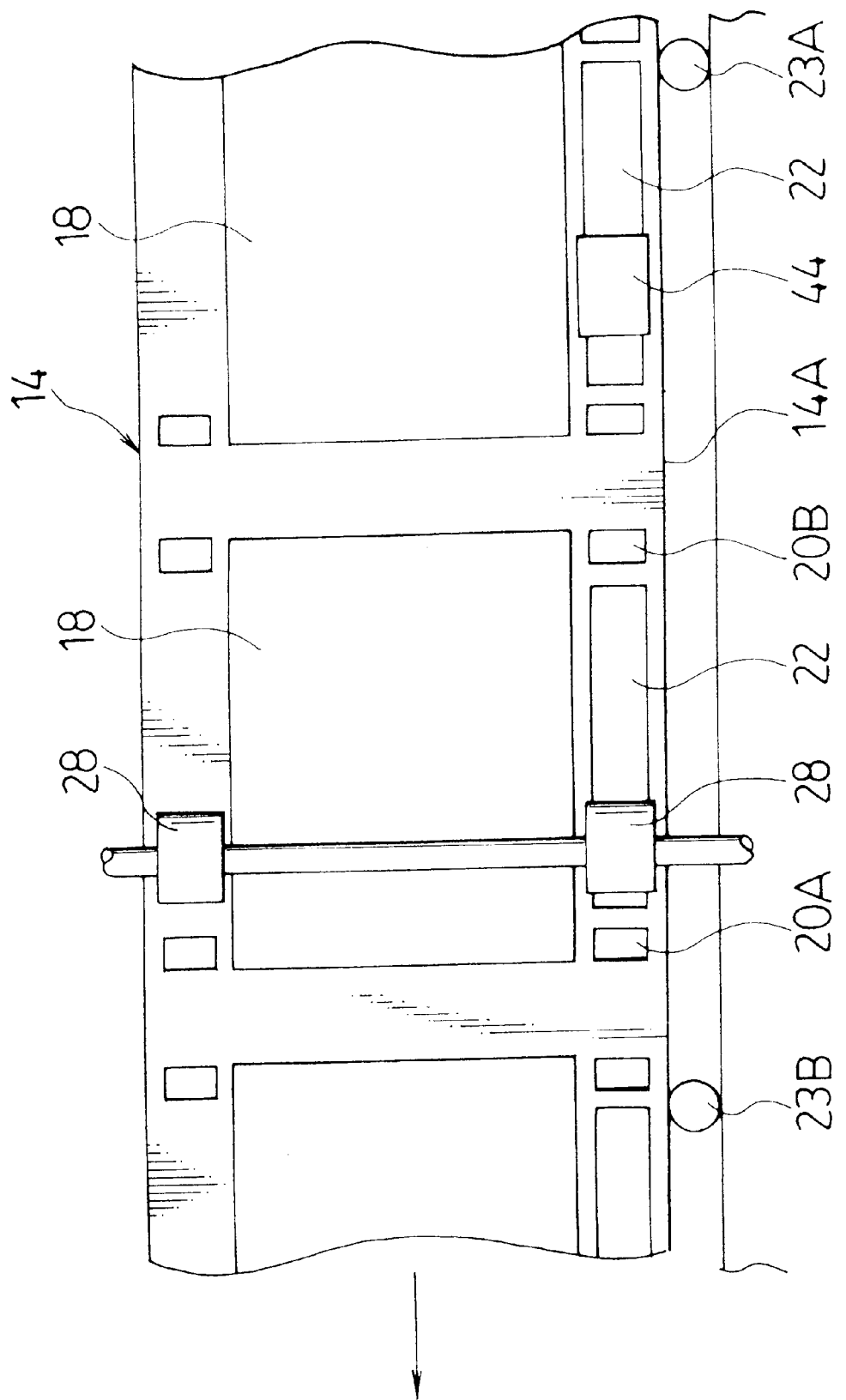
FIG. 3 is a plan view taken along line 3—3 of FIG. 1, illustrating a positional relationship between a guide pin and a pinch roller.
Figure 4:
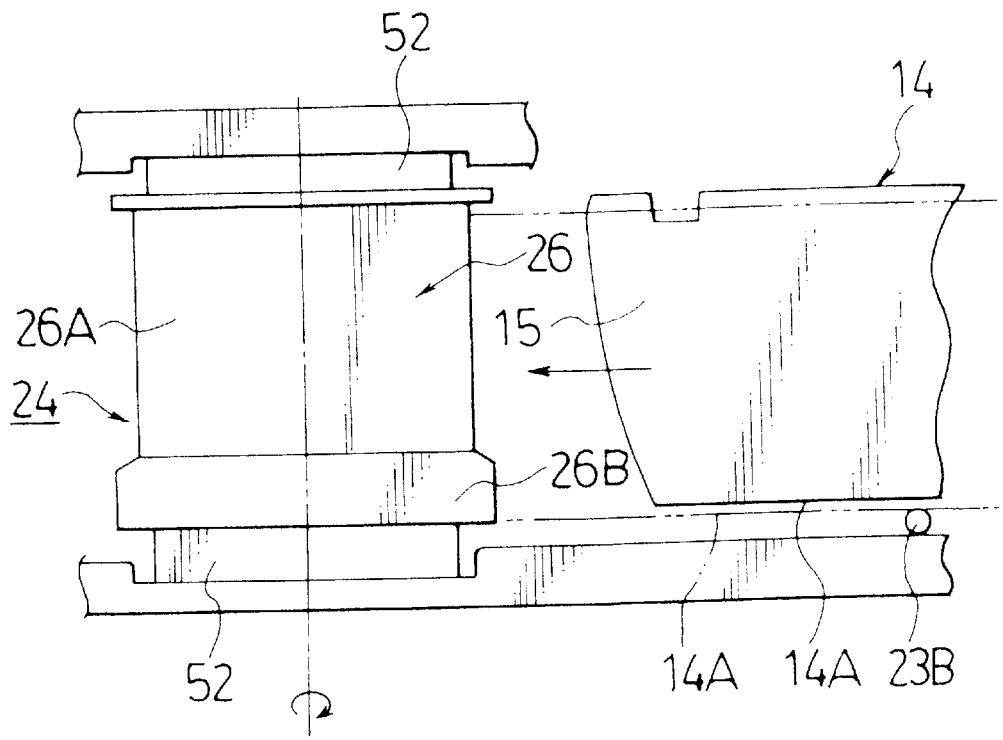
FIG. 4 is a view illustrating the first embodiment of a windup reel.

The magnetic head device 42, the capstan 28 and the pinch roller 30 are arranged between the guide pins 23A and 23B as depicted in FIG. 3. The guide pins 23A, 23B and the magnetic head 44 are positioned so that the magnetic head 44 accurately contacts the magnetic recording layer 22 when a lower edge 14A of the photographic film 14 is pressed against the guide pins 23A and 23B.

Figure 5:
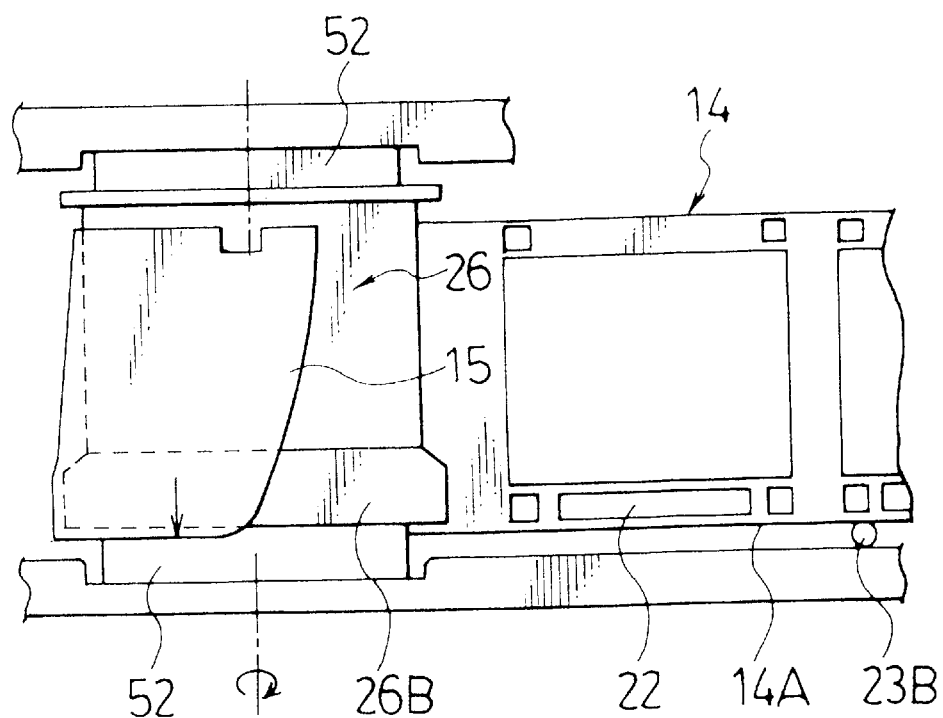
FIG. 5 is a view illustrating the windup reel in FIG. 4 winding up the photographic film.

The windup reel 26 is constructed in the following manner. Rotational shafts 52 and 52 are arranged in the film windup chamber 24. The windup reel 26 has a small diameter section 26A and a large diameter section 26B. The large diameter section 26B is formed in the direction in which the lower edge 14A of the photographic film is pressed against the guide pin 23B. When the leader section 15 of the transported photographic film 14 is wound on the windup reel 26, the leader section 15 becomes diagonal so as to fit the surface of the large diameter section 26B as indicated in FIG. 5. Then the leader section 15 starts moving down in the drawing by the rotation of the windup reel 26. As shown in FIG. 5, the photographic film 14 is thereby wound up by the windup reel 26 in such a state that the lower edge 14A is pressed against the guide pin 23B.

FIG. 6 is a first variation of the first embodiment, illustrating the half section of the windup reel. As depicted in FIG. 6, the windup reel is constructed in such a manner that a columnar core 54 is covered with rubber 56, and a tape 58 is put between the core 54 and the rubber 56 so that the core 54 can be swelled to form the large diameter part 26B. FIG. 7 is a second variation of the first embodiment, illustrating the half section of the windup reel. As depicted in FIG. 7, the windup reel is constructed in such a manner that the core 54 is covered with rubber 60, and the large diameter section 26B is formed to be thicker than the small diameter section 26A.

Next, an explanation will be given about the operation of the film transporting device which is constructed in the above-mentioned manner.

The photographic film 14 is pulled out from the film cartridge 12, and is guided by the upstream guide pin 23A to pass through the magnetic head 42 and the scan area. The photographic film 14 is transported at a constant speed by the capstan 28 and the pinch roller 30, and then the film 14 is guided by the downstream guide pin 23B to be wound up by the windup reel 26.

When the leader section 15 of the photographic film 14 is wound on the windup reel 26, the leader section 15 becomes slanted so as to fit the surface of the large diameter section 26B. Then the leader section 15 starts moving down in the drawing by the rotation of the windup reel 26. As shown in FIG. 5, the photographic film 14 is wound up by the windup reel 26 in such a manner that the lower edge 14A of the film 14 is pressed against the guide pin 23B.

Thus, the photographic film 14 is fed in a state of being positioned toward the magnetic head 44, so that the magnetic recording layer 22 can be prevented from being displaced from the magnetic head 44. In this embodiment, the information can be correctly read in and from the magnetic recording layer 22 by the magnetic head 44. The film images can be accurately read without a problem in which the screen is warped.

Figure 8:
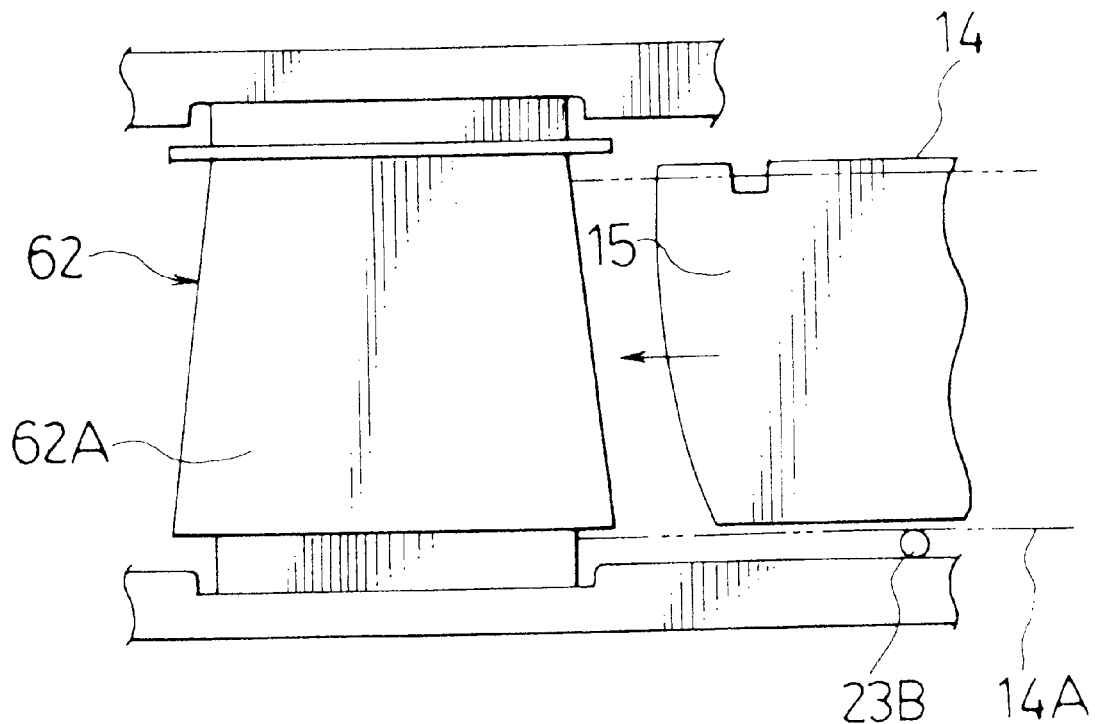
FIG. 8 is a view illustrating the second embodiment.

FIG. 8 illustrates the second embodiment of the windup reel. The windup reel in FIG. 8 is a step reel whose diameter widens in a direction (downward direction in FIG. 8) in which the photographic film is pressed. When the leader section 15 of the photographic film 14 is wound on the windup reel 62, the leader section 15 becomes slanted so as to fit the surface 62A of the windup reel 62. Then, the leader section 15 starts moving down in the drawing by the rotation of the windup reel 62. The photographic film 14 is wound up by the windup reel 26 in a state of being pressed against the guide pin 23B as indicated by long and short alternate lines in FIG. 8.

As is the case with the first embodiment, the photographic film 14 can be fed toward the magnetic head 44, and thereby the information can be correctly read in and from the magnetic recording layer 22, and the film images can be accurately read without a problem in that the images are warped.

Figure 9:
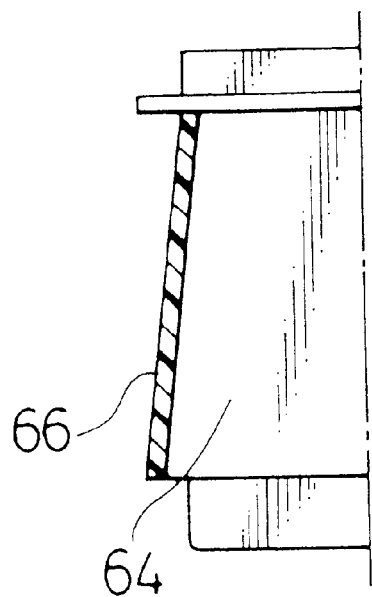
FIG. 9 is a partially sectional view illustrating a first variation of the second embodiment of the windup reel in FIG. 8.
Figure 10:
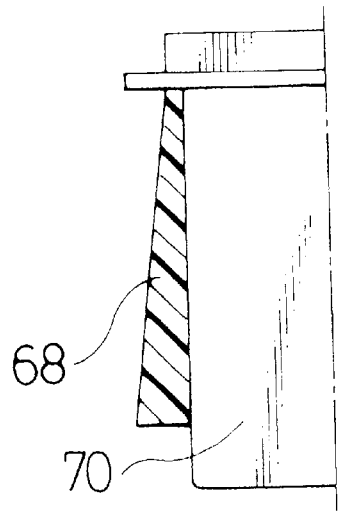
FIG. 10 is a partially sectional view illustrating a second variation of the second embodiment of the windup reel in FIG. 8.

FIG. 9 shows the half section of a windup reel such as shown in FIG. 8. As depicted in FIG. 9, the windup reel is constructed in such a manner that a truncated cone core 64 is covered with rubber 66 which has uniform thickness. FIG. 10 is a variation of the second embodiment of the half section of the windup reel. As depicted in FIG. 10, the windup reel is constructed in such a manner that a columnar core 70 is covered with rubber 68 which becomes thicker along the direction in which the photographic film 14 is pressed.

Figure 11:
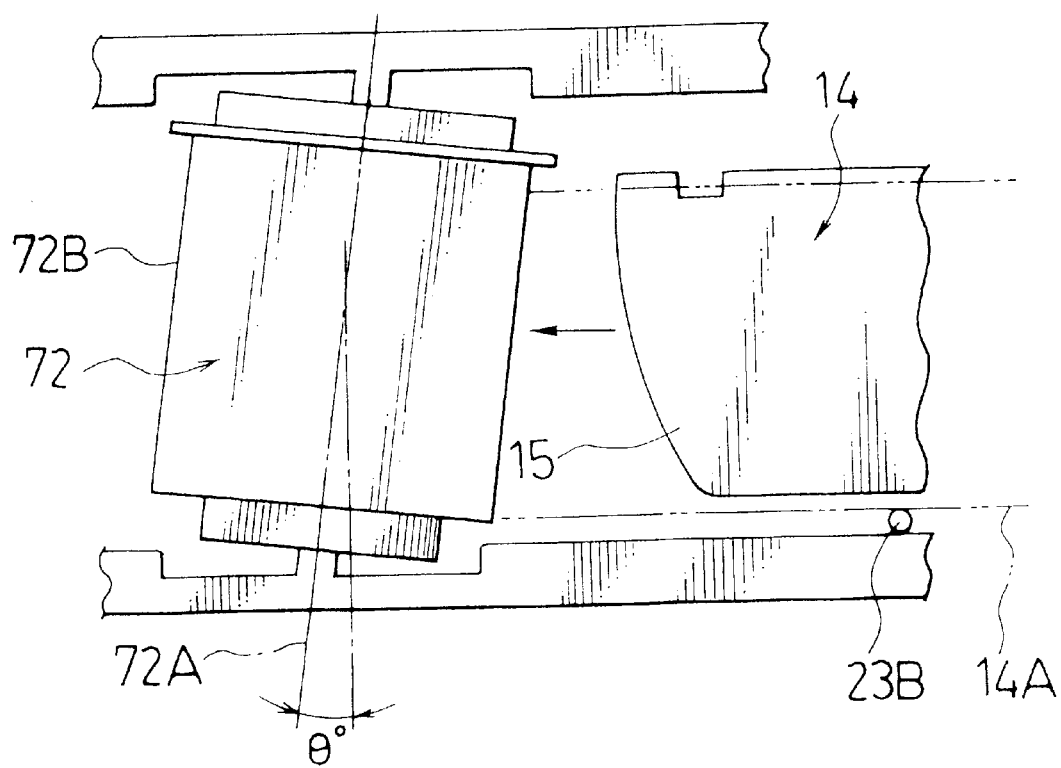
FIG. 11 is a view illustrating a third embodiment of the windup reel.

FIG. 11 shows a third embodiment of the windup reel. A rotational axis 72A of the columnar windup reel 72 is attached at a position to be inclined by $\theta°$ with regard to the direction of the width of the photographic film 14 in a direction to move away from the guide pin 23B. When the leader section 15 of the photographic film 14 is wound on the windup reel 72, the leader section 15 becomes diagonal so as to fit the inclined surface 72B of the windup reel 72. Then, the leader section 15 starts moving down in the drawing by the rotation of the windup reel 72. The photographic film 14 is wound up by the windup reel 72 in a state of being pressed against the guide pin 23B as indicated by long and short alternate lines in FIG. 11.

As is the case with the first and second embodiments, in the third embodiment, the photographic film 14 can be fed toward the magnetic head 44, and the information can thereby be correctly read in and from the magnetic recording layer 22, and the film images can be accurately read.

As stated above, according to the first, second and third embodiments, only if the shape of the windup reels 26 and 62 is changed, or if the rotational axis 72A of the windup reel 72 is inclined, the displacement of the photographic film 14 can be prevented during transportation.

Figure 12:
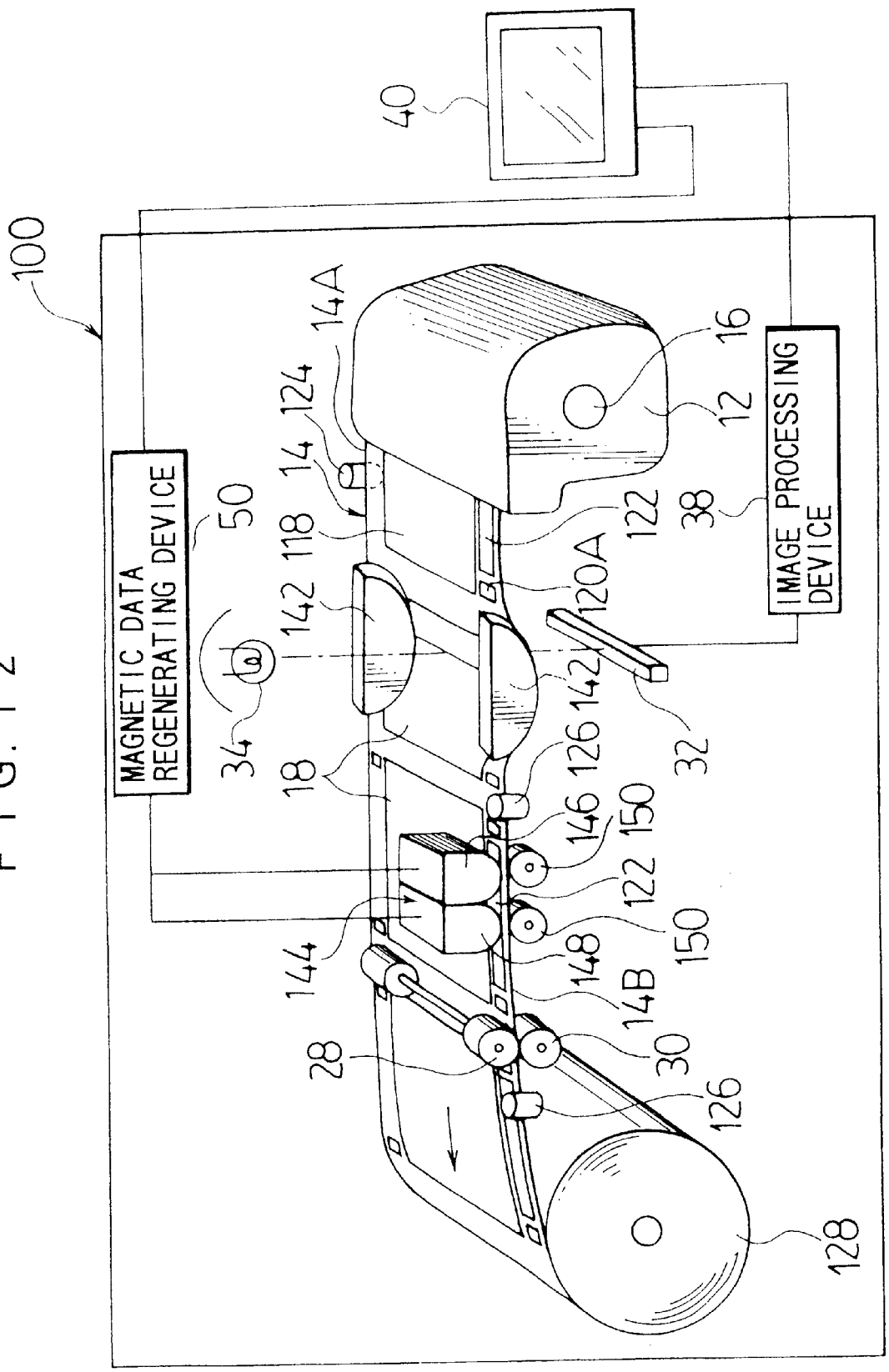
FIG. 12 is a view illustrating the structure of a film scanner of a fourth embodiment of the film transporting device according to the present invention.

FIG. 12 illustrates the structure of the film scanner which is a fourth embodiment of the film transporting device according to the present invention.

The film scanner reads the film images during feeding of the developed photographic film coated with the magnetic recording layer. The film scanner also reads the information recorded in the magnetic recording layer on the photographic film, or writes the information in the magnetic recording layer. Parts similar to those of the film scanner previously described with reference to FIG. 1 are denoted by the same reference numerals, and they are not described in detail here.

As depicted in FIG. 12, the film cartridge 12 in which the photographic film 14 is wound on the spool 16 is mounted in the film scanner body 100. The photographic film 14 is sent out from the film cartridge 12 by the film driving mechanism. Then the photographic film 14 is regulated in position by a guide pin 124 and a pair of the guide pins 126 and 126, and is fed in the direction of an arrow in FIG. 12. A detailed explanation will be given later about the guide pin 124 and the pair of the guide pins 126 and 126.

The photographic film 14 passes through the scan area which is provided with the CCD line sensor 32 and the light source 34, and then passes through a magnetic head device 144. In the magnetic head device 144, magnetic heads 146 and 148 for recording and regeneration are arranged adjacent to each other, and the magnetic heads 146 and 148 are fixed to the film scanner body 100. Pads 150 and 150 are arranged on the bottom side of the photographic film 14 to face the magnetic heads 146 and 148. The pads 150 and 150 are pushed up by a spring (not shown), and they press the magnetic recording layer 22 of the photographic film 14 against the magnetic heads 146 and 146. The magnetic head device 144 is thereby able to write the information in the magnetic recording layer 22 from the magnetic head 146, and read out the information written in the magnetic recording layer 22 by the magnetic head 148.

If viewed from the curved guide plates or members 142, the guide pin 124 is arranged closer to the film cartridge 12 than to the windup reel 128. The guide pin 124 is fixed at such a position as to abut on the edge 14A of the photographic film 14 which is being fed.

On the other hand, the pair of guide pins 126 are arranged closer to the windup reel 128 than to the film cartridge 12 if viewed from the guide plates 142. The pair of the guide pins 126 are fixed to both sides of the magnetic head device 144. The photographic film 14 passes through the magnetic head device 144 in such a state that the edge 14B is pressed against the pair of the guide pins 126 by the force of a pressing means (not shown).

The guide pins 124 and 126 are arranged at intervals of a substantially median value of a difference of the width of the photographic film.

The pressing means favorably pushes the photographic film toward the guide pins 126 during feeding by changing the outer diameter of the windup reel 128 or inclining the rotational axis of the windup reel. The present invention, however, is not restricted to this. For example, it is possible to use a mechanism which is disclosed in Japanese Patent Application No. 6-313266 by the applicant of the present application.

Next, an explanation will be given about the operation of the guide pins 124 and 126.

The edge 14A of the photographic film 14 is fed in such a manner that the guide pin 124 regulates the position of the edge 14A, and the edge 14B is pressed against the guide pins 126. That is, as depicted in FIG. 13, the photographic film 14 is fed in a state of being positioned on a feed path between the guide pin 124 and the guide pins 126. In this case, if the mounting positions of the film cartridge are uneven, the guide pins 124 and 126 can correct the slant or zigzag movement of the photographic film 14 resulting from the unevenness.

Thus, the photographic film 14 can be kept flat at a position (position A in FIG. 13) of the guide plate 142 arranged between the guide pins 124 and 126, regardless of the unevenness of the positions where the film cartridge 12 is mounted. The line sensor 32 thereby picks up the frame images which are not warped, so that the satisfactory images can be displayed on the TV monitor 40. Because the edge 14B of the photographic film 14 is pressed against the guide pins 126, the magnetic information can be steadily read or written by means of the magnetic heads 146 and 148.

If the guide pin 124 is arranged between the guide pins 126, the position of the photographic film 14 cannot be regulated upstream of the guide plate 142. For this reason, the photographic film cannot be kept flat, and the intervals at which the guide pins are arranged cannot be set at less than a maximum value of the difference of the width of the photographic film 14. Thus, the position of the photographic film 14 cannot be regulated without fail.

In this embodiment, the guide pin is used as the guide member for regulating the positions of both edges of the photographic film; however, the present invention is not restricted to this. Moreover, the film transporting device of the present invention can be applied not only to the film scanner but to a camera and a film viewer in which film images are viewed with a person's eyes. In this case, an exposed area of the camera, or an observed area of the film viewer is favorably arranged between two guide members which regulate the positions of both edges of the photographic film.

As set forth hereinabove, according to the film transporting device of the present invention, only if the outer diameter of the windup reel is changed, or if the rotational axis is inclined, the force can be applied to the photographic film so that the photographic film can fit the guide member, and thereby the photographic film can be prevented from moving on a slant or zigzagging.

In the case of the photographic film provided with the magnetic recording layer, the information can be correctly read from or written in the magnetic recording layer. The frame images on the photographic film can also be correctly read. Further, when the camera exposes the photographic film to light, the exposed area of each frame can be accurately exposed to light.

According to the present invention, while the photographic film is transported from the film supplying section to the film windup section, the photographic film can be prevented from moving at a slant or zigzagging. The photographic film can be wound up to a predetermined position of the windup reel, and when the photographic film is fed from the windup reel, the photographic film can thereby be prevented from moving on a slant or zigzagging. In this case, the magnetic information can be read or written, or the frame images can be read satisfactorily.

It should be understood, however, that there is no intention to limit the invention to the specific forms disclosed, but on the contrary, the invention is to cover all modifications, alternate constructions and equivalents falling within the spirit and scope of the invention as expressed in the appended claims.

We claim:

1. A film transporting device, comprising:
    means for continuously supplying photographic film;
    a windup reel for winding up the photographic film supplied from said film supplying means; and
    means for guiding the photographic film transported between said film supplying means and said windup reel, said guiding means comprising guide members for regulating movement of the photographic film in a direction of width of the film during transporting of the photographic film, wherein
    said guide members are positioned at opposite edges of the photographic film between said film supplying means and said windup reel, and said guide members are offset from each other in a direction in which the photographic film is transported between said film supplying means and said windup reel, and one guide member has a contact part capable of contacting one edge of the photographic film at a plurality of points at the same time, and another guide member has a contact part capable of contacting the other edge of the photographic film at a position spaced apart from a maximum contact part at said plurality of points in the direction in which the photographic film is transported, and wherein an interval between said guide members in the direction of width of the film is equal to a median value of a difference in width of different photographic films.

2. The film transporting device as defined in claim 1, further comprising means for pressing an edge of the photographic film against one of said guide members.

3. The film transporting device as defined in claim 2, wherein said pressing means is a windup reel whose outer diameter changes in an axial direction so that said edge of the photographic film is pressed against said one of said guide members, when the photographic film is wound on said windup reel.

4. The film transporting device as defined in claim 2, wherein said pressing means is a windup reel whose rotational axis inclines so that said edge of the photographic film is pressed against said one of said guide members, when the photographic film is wound on said windup reel.

5. The film transporting device as defined in claim 1, wherein said guide members are three pins, and a first one of said three pins is positioned at one edge of the photographic film, and second and third ones of said three pins are positioned at an opposite edge of the photographic film.

6. The film transporting device as defined in claim 1, wherein said guiding means further comprises a curved guide member positioned to contact a surface of the photographic film adjacent one of the edges of the photographic film.

7. The film transporting device as defined in claim 1, further comprising a magnetic head for recording magnetic information in a magnetic recording layer of the photographic film or regenerating the magnetic information from the magnetic recording layer.

8. The film transporting device as defined in claim 1, wherein the photographic film is housed in a film cartridge having a rotatable spool around which the photographic film is wound, and said film supplying means comprises a cartridge housing section housing the film cartridge and spool driving means coupled to the spool and driving the spool.

9. A film scanner device, comprising:

means for continuously supplying photographic film;

a windup reel for winding up the photographic film supplied from said film supplying means; and means for guiding the photographic film transported between said film supplying means and said windup reel, said guiding means comprising guide members for regulating movement of the photographic film in a direction of width of the film during transporting of the photographic film, wherein said guide members are positioned at opposite edges of the photographic film between said film supplying means and said windup reel, and said guide members are offset from each other in a direction in which the photographic film is transported between said film supplying means and said windup reel, and one guide member has a contact part capable of contacting one edge of the photographic film at a plurality of points at the same time, and another guide member has a contact part capable of contacting the other edge of the photographic film at a position spaced apart from a maximum contact part at said plurality of points in the direction in which the photographic film is transported, and wherein an interval between said guide members in the direction of width of the film is equal to a median value of a difference in width of different photographic films.

10. The film transporting device as defined in claim 1, wherein a first one of said guide members is positioned at one edge of the photographic film, and second and third ones of said guide members are positioned at another edge of the photographic film, wherein said guiding means further comprises a curved guide member positioned to contact a surface of the photographic film adjacent said another edge of the photographic film, and wherein when viewed from said curved guide member, said first one of said guide members is positioned closer to said film supplying means than to said windup reel, and when viewed from said curved guide member, said second and third ones of said guide members are positioned closer to said windup reel than to said film supplying means.

11. The film transporting device as defined in claim 10, further comprising a magnetic head positioned adjacent said another edge of the photographic film, said magnetic head being disposed between said second and third ones of said guide members in the direction in which the photographic film is transported between said film supplying means and said windup reel.

* * * * *